United States Patent
D'Alterio et al.

(10) Patent No.: US 9,009,538 B2
(45) Date of Patent: *Apr. 14, 2015

(54) ANALYSIS OF TESTS OF SOFTWARE PROGRAMS BASED ON CLASSIFICATION OF FAILED TEST CASES

(71) Applicant: International Business Machines Corporation, Armonk, NY (US)

(72) Inventors: Domenico D'Alterio, Rome (IT); Gianluca Mariani, Rome (IT); Riccardo Rossi, Rome (IT); Antonio Secomandi, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/785,521

(22) Filed: Mar. 5, 2013

(65) Prior Publication Data

US 2013/0185595 A1 Jul. 18, 2013

Related U.S. Application Data

(63) Continuation of application No. 13/627,229, filed on Sep. 26, 2012.

(30) Foreign Application Priority Data

Dec. 8, 2011 (EP) .................................... 11192533

(51) Int. Cl.
*G06F 11/00* (2006.01)
*G06F 9/44* (2006.01)
*G06F 11/36* (2006.01)

(52) U.S. Cl.
CPC ........ *G06F 11/3692* (2013.01); *G06F 11/3684* (2013.01)

(58) Field of Classification Search
CPC .. G06F 11/36; G06F 11/3668; G06F 11/3684
USPC .......................................... 714/38.1; 717/134
See application file for complete search history.

(56) References Cited

U.S. PATENT DOCUMENTS 6,002,869 A 12/1999 Hinckley
7,779,303 B2 * 8/2010 Stubbs et al. ............... 714/38.14
(Continued)

OTHER PUBLICATIONS

D'Alterio et al., "Analysis of Tests of Software Programs Based on Classification of Failed Test Cases," U.S. Appl. No. 13/627,229, filed Sep. 26, 2012, 33 pages.

(Continued)

*Primary Examiner* — Scott Baderman
*Assistant Examiner* — Paul Contino
(74) *Attorney, Agent, or Firm* — Yee & Associates, P.C.; Jeffrey S. LaBaw

(57) ABSTRACT

A solution is proposed for analyzing a test of a software program comprising a plurality of software components, the test comprising a plurality of test cases each one for exercising a set of corresponding exercised software components. A corresponding method comprises the steps of receiving an indication of each failed test case whose current execution has failed, retrieving a suspicion attribute of each failed test case indicative of a change to the corresponding exercised software components since a previous execution of the failed test case, retrieving a change attribute of each failed test case indicative of a change to the failed test case since the previous execution thereof, retrieving a regression attribute of each failed test case indicative of a regression of the failed test case since the previous execution thereof, and classifying each failed test case into a plurality of disjoint classes according to the corresponding suspicion attribute, change attribute and regression attribute.

12 Claims, 6 Drawing Sheets

(56) References Cited

U.S. PATENT DOCUMENTS

| | | |
|---|---|---|
| 2005/0204201 A1 | 9/2005 | Meenakshisundaram et al. |
| 2006/0107121 A1* | 5/2006 | Mendrala et al. ............... 714/38 |
| 2006/0168565 A1* | 7/2006 | Gamma et al. ................ 717/122 |
| 2007/0006037 A1 | 1/2007 | Sargusingh et al. |
| 2008/0222501 A1 | 9/2008 | Travison, Jr. et al. |
| 2008/0244320 A1* | 10/2008 | Kelso ............................. 714/38 |
| 2009/0265694 A1 | 10/2009 | Bakowski |
| 2010/0100871 A1* | 4/2010 | Celeskey et al. .............. 717/124 |
| 2013/0151906 A1 | 6/2013 | D'Alterio et al. |

OTHER PUBLICATIONS

Final Office Action, dated Jul. 31, 2014, regarding U.S. Appl. No. 13/627,229, 13 pages.

Office Action, dated Apr. 22, 2014, regarding U.S. Appl. No. 13/627,229, 20 pages.

* cited by examiner

ANALYSIS OF TESTS OF SOFTWARE PROGRAMS BASED ON CLASSIFICATION OF FAILED TEST CASES

CROSS-REFERENCE TO RELATED APPLICATION(S)

This application is a Continuation of and claims the benefit of priority to U.S. patent application Ser. No. 13/627,229, filed on Sep. 26, 2012 and entitled "Analysis of Tests of Software Programs Based on Classification of Failed Test Cases", which claims priority to European Patent Application No. 11192533.5, filed on Dec. 8, 2011, the contents of which are hereby incorporated by reference.

TECHNICAL FIELD

The solution according to one or more embodiments of the present invention relates to the data-processing field. More specifically, this solution relates to the analysis of tests of software products.

BACKGROUND ART

The test of software products is a very critical activity in any phase of their lifecycle. Generally speaking, every execution of a test of a specific software product is aimed at verifying whether the software product behaves correctly as expected (for example, from the point of view of its functions, requirements and performance). For this purpose, a bucket of test cases is commonly executed on the software product, each one for verifying a specific aspect of the software product. The number of test cases may be very high (up to the order of several thousands), especially in the test of large software applications (such as with a distributed architecture).

In order to facilitate this activity, a test automation infrastructure may be exploited. The test automation infrastructure automatically controls the test by planning the execution of its test cases, capturing corresponding results, and outputting a test report showing them. In this way, the test may be executed repeatedly in a relatively fast way, generally in completely unattended mode. Examples of techniques relating to test automation infrastructures are disclosed in U.S. Pat. No. 6,002,869 and US-A-2005/0204201 (the entire discloses of which are herein incorporated by reference).

The test report provides very useful information to one or more human test analysts in charge of analyzing the test of the software product; for example, the test report typically indicates a progress of the test, the test cases whose execution has failed, when they have been executed, and the like.

However, the analysis of the test report (for example, to infer the causes of the failed test cases and possibly correct them) is a substantial manual task. Indeed, the analysis is generally based on an investigation activity, which requires a heavy human intervention; therefore, this activity is very laborious and time consuming.

The problem is particularly acute when the number of failed test cases is very high. This makes it impractical to analyze all the failed test cases; however, the selection of the failed test cases on which the analysis should focus is completely based on a skill of the test analysts. In any case, the test report may become so complex to be very difficult to interpret.

In order to tackle this problem, some techniques have been proposed for automatically reducing the complexity of the analysis of the failed test cases.

For example, US-A-2007/0006037 (the entire disclose of which is herein incorporated by reference) filters out the failed test cases representative of defects already reflected in historical information; this is based on an automated comparison among defect symptoms associated with the failed test cases and defect symptoms that are known to be not of interest (for example, because due to environmental issues). However, this technique is not very accurate (since it is mainly based on statistical information); moreover, it requires a pre-analysis activity to determine the failed test cases due to environmental issues.

Likewise, US-A-2008/0222501 classifies the failed test cases according to their correspondence with historical failed test cases; for this purpose, attributes of the failed test cases are compared with corresponding attributes of the historical failed test cases, so as to determine recurring failed test cases relating to the same defects according to their degree of matching. However, this technique requires a manual definition of the attributes to be compared; moreover, it does not work efficiently when the software product is very dynamic (since it requires a high manual effort to keep the attributes up-to-date).

At the end, US-A-2009/0265694 selects the failed test cases to be first analyzed according to a corresponding hierarchy; particularly, this selection takes into account whether exercised classes have been recently changed, the relative complexity of the failed test cases and the likelihood that the correction of the corresponding defects may automatically correct the defects of other failed test cases as well.

However, none of the techniques known in the art takes into account the dynamic development of the software product and/or of the test cases.

Moreover, none of them provides any hint towards the possible causes of the failed test cases.

SUMMARY OF THE INVENTION

In its general terms, the solution according to one or more embodiments of the present invention is based in the idea of classifying the failed test cases according to a development of the software product.

Particularly, one or more aspects of the solution according to specific embodiments of the invention are set out in the independent claims and advantageous features of the same solution are set out in the dependent claims, with the wording of all the claims that is herein incorporated verbatim by reference (with any advantageous feature provided with reference to a specific aspect of the solution according to an embodiment of the invention that applies mutatis mutandis to every other aspect thereof).

More specifically, an aspect of the solution according to an embodiment of the invention provides a method for analyzing a test of a software program, wherein each failed test case is classified according to a change to the corresponding exercised software components, a change to the failed test case and a regression of the failed test case (since its previous execution).

A further aspect of the solution according to an embodiment of the invention provides a corresponding computer program.

A still further aspect of the solution according to an embodiment of the invention provides a corresponding computer program product.

A different aspect of the solution according to an embodiment of the invention provides a corresponding data-processing system.

BRIEF DESCRIPTION OF THE DRAWINGS

The solution according to one or more embodiments of the invention, as well as further features and the advantages thereof, will be best understood with reference to the following detailed description, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as value, content and representation). Particularly.

DETAILED DESCRIPTION

Figure 1:
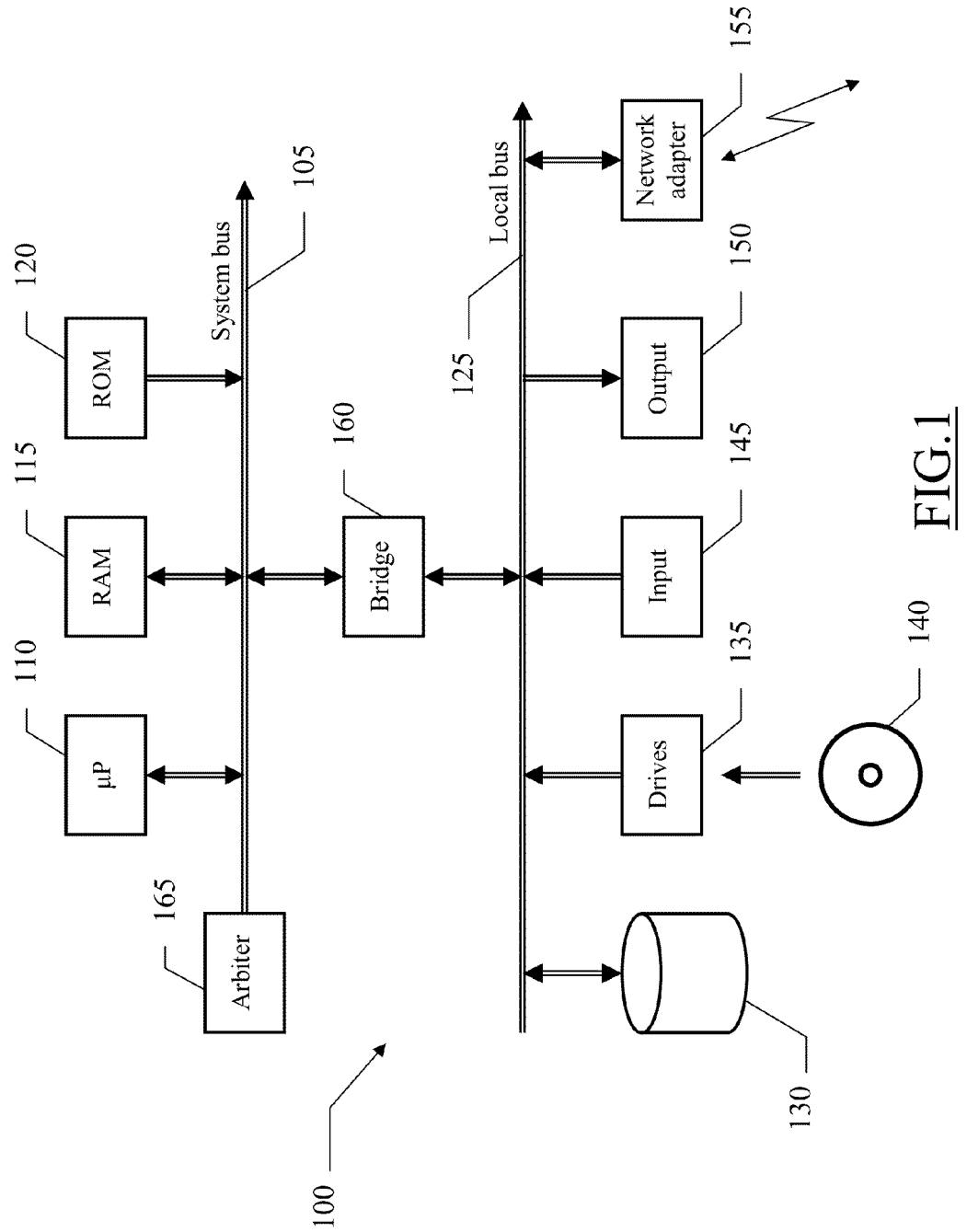
FIG. 1 shows a pictorial representation of a data-processing system that may be used to practice the solution according to an embodiment of the invention.

With reference in particular to the FIG. 1, a pictorial representation is shown of a data-processing system 100 that may be used to practice the solution according to an embodiment of the invention. The data-processing system 100 (for example, an analysis server) comprises several units that are connected in parallel to a system bus 105. In detail, one or more microprocessors (µP) 110 control operation of the analysis server 100; a RAM 115 is used as a working memory by the microprocessors 110, and a ROM 120 stores basic code for a bootstrap of the analysis server 100. Several peripheral units are clustered around a local bus 125 (by means of respective interfaces). Particularly, a mass memory comprises one or more hard-disks 130 and drives 135 for reading DVD- or CD-ROMs 140. Moreover, the analysis server 100 comprises input units 145 (for example, a keyboard and a mouse), and output units 150 (for example, a monitor and a printer). A network adapter 155 is used to connect the analysis server 100 to a network (not shown in the figure). A bridge unit 160 interfaces the system bus 105 with the local bus 125. Each microprocessor 110 and the bridge unit 160 may operate as master agents requesting an access to the system bus 105 for transmitting information. An arbiter 165 manages the granting of the access with mutual exclusion to the system bus 105.

The analysis server 100 is used to analyze a test of a software product (for example, a large software application), which has been executed on the same or on a different data-processing system (for example, on a test network). The test comprises a bucket of test cases, each one for verifying a specific aspect of the software product; for this purpose, each test case comprises a set of instructions and an indication of an expected outcome of their application. Each execution of the test involves the execution of each one of its test cases (according to a corresponding test plan). For this purpose, the instructions of the test case are applied to the software product, and an actual outcome thereof is registered. The execution of the test case has passed (and a result of this passed test case is set to a passed value) when the actual outcome of the test case matches its expected outcome; otherwise, the execution of the test case has failed (and a result of this failed test case is set to a failed value) when an unexpected outcome is obtained (i.e., the actual outcome does not match the expected outcome, the software product has crashed, it has entered an endless loop or any other improper operating condition). A result of (the execution of) the test is defined by the results of all its test cases (for example, listed in a corresponding test report).

Each failed test case is then classified into one of a discrete set of disjoint classes according to the values of a set of attributes of the failed test case (so as to facilitate the analysis of the test report).

Figure 2:
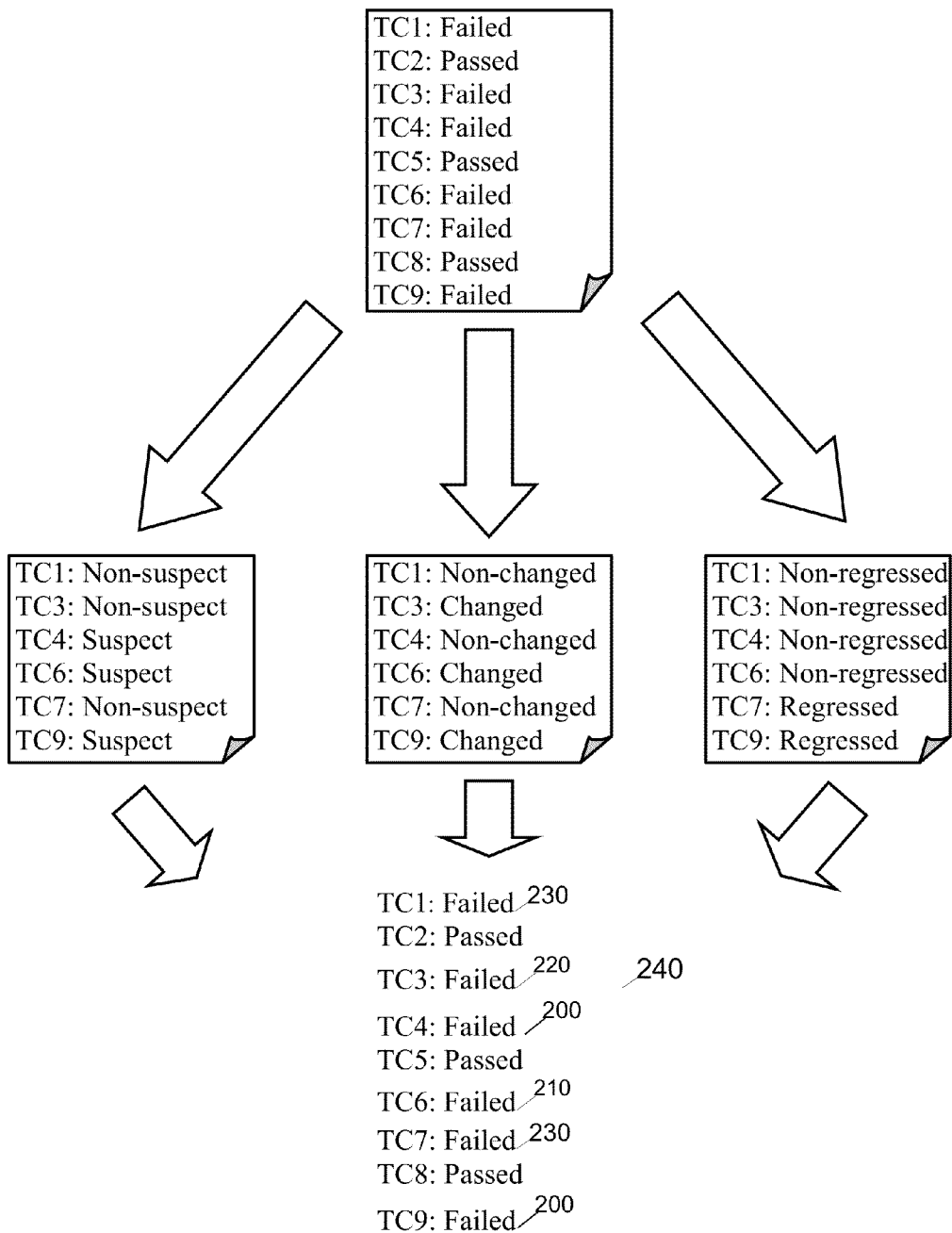
FIG. 2 shows an exemplary application of the solution according to an embodiment of the invention.

Particularly, an exemplary application of the solution according to an embodiment of the invention is shown in the FIG. 2.

As usual, an indication of each failed test case of a current execution of the test (i.e., the one under analysis) is received—for example, by importing the corresponding test report. In the specific scenario at issue, the following test cases TC1-TC9 have provided the results:

TC1: Failed
TC2: Passed
TC3: Failed
TC4: Failed
TC5: Passed
TC6: Failed
TC7: Failed
TC8: Passed
TC9: Failed.

In the solution according to an embodiment of the invention, a suspicion attribute of each failed test case is retrieved. The suspicion attribute indicates a change to software components of the software product that have been exercised by the failed test case since a previous execution thereof (as described in detail in the following); for example, the suspicion attribute may have a suspect value when at least one of the corresponding exercised software components has been changed or a non-suspect value otherwise (when none of the corresponding exercised software components has been changed). In the specific scenario at issue, the failed test cases TC1,TC3,TC4,TC6,TC7,TC9 have the following values of their suspicion attributes:

TC1: Non-suspect
TC3: Non-suspect
TC4: Suspect
TC6: Suspect
TC7: Non-suspect
TC9: Suspect.

Moreover, a change attribute of each failed test case is retrieved. The change attribute indicates a change to the failed test case since a previous execution thereof; or example, the change attribute may have a changed value when the failed test case has been changed or a non-changed value otherwise (when the failed test case has not been changed). In the specific scenario at issue, the failed test cases TC1,TC3,TC4, TC6,TC7,TC9 have the following values of their change attributes:

TC1: Non-changed
TC3: Changed
TC4: Non-changed
TC6: Changed
TC7: Non-changed
TC9: Changed.

At the end, a regression attribute of each failed test case is retrieved. The regression attribute indicates a regression of the failed test case since the previous execution thereof; for example, the regression attribute may have a regressed value when the previous execution of the failed test case has failed as well, or a non-regressed value otherwise (when the previous execution of the failed test case instead has passed). In the specific scenario at issue, the failed test cases TC1,TC3,TC4, TC6,TC7,TC9 have the following values of their regression attributes:

TC1: Non-regressed
TC3: Non-regressed
TC4: Non-regressed
TC6: Non-regressed
TC7: Regressed
TC9: Regressed.

Each failed test case is then classified according to the corresponding suspicion attribute, change attribute and regression attribute.

Therefore, the classification of the failed test cases is based on a dynamic development of the software product (as defined by their suspicion attributes) and of the test cases (as defined by their change attributes).

Moreover, this contextualizes the failed test cases, thereby providing a very useful hint towards their possible causes (thanks to the correlation of their suspicion attributes, change attributes and regression attributes).

All of the above significantly simplifies the analysis of the result of the test (especially in complex test reports with a very high number of failed test cases). Indeed, in this way it is possible to concentrate directly on the failed test cases that are likely to relate to actual defects of the software product (by disregarding the other ones, at least at a first level of analysis).

The classification of the failed test cases so obtained is very accurate (for the purpose of inferring the causes of their failures).

Moreover, this result may be achieved automatically (substantially with no manual intervention).

For example, in a specific implementation of the solution according to an embodiment of the invention four classes are defined for different levels of severity of a defect that is likely to have caused the corresponding failure (i.e., a very high severity class, a high severity class, a medium severity class and a low severity class in decreasing order of severity). The failed test cases are classified into these classes according to the following classification rules.

Particularly, when the regression attribute has the non-regressed value (since the result of the failed test case changed from the passed value to the failed value) this means that a new defect has been injected since the previous execution of the failed test case.

In this condition, when the suspicion attribute has the suspect value (since one or more of its exercised software components have been changed) and the change attribute has the non-changed value (since the failed test case instead has not been changed), this means that the new defect is likely to relate to an error that has been added to the (changed) exercised software components; therefore, the failed test case is assigned to the very high severity class (like for the failed test case TC4).

Conversely, when the suspicion attribute has again the suspect value (since its exercised software components have been changed) but the change attribute now has the changed value (since the failed test case has been changed as well), this means that the new defect may relate to an error that has been added to the exercised software components, to the failed test case or to both of them; therefore, the failed test case is assigned to the high severity class (like for the failed test case TC6).

In the same condition, when the suspicion attribute has the non-suspect value (since none of its exercised software components has been changed) and the change attribute has the changed value (since the failed test case instead has been changed), this means that the new defect is likely to relate to an error that has been added to the failed test case; therefore, the failed test case is assigned to the medium severity class (like for the failed test case TC3).

Conversely, when the suspicion attribute has again the non-suspect value (since no exercised software component has been changed) but the change attribute now has the non-changed value (since the failed test case has not been changed either), this means that the new defect is likely to relate to an environmental issue independent of the software product and of the failed test case; therefore, the failed test case is assigned to the low severity class (like for the failed test case TC1).

On the other hand, when the regression attribute has the regressed value (since the result of the failed test case maintained the failed value) this means that a defect was already present at the previous execution of the test case.

In this condition, when the suspicion attribute has the non-suspect value (since no exercised software component has been changed) and the change attribute has the non-changed value (since the failed test case has not been changed either), this means that the defect is likely to be the same as at the previous execution of the failed test case; therefore, the failed test case is assigned to the same class of its previous execution (like for the failed test case TC7—for example, previously assigned to the low severity class).

Conversely, when the suspicion attribute has the suspect value (since its exercised software components have been changed) and/or the change attribute has the changed value (since the failed test case has been changed), this means that the defect may be the same, a new defect may have been added or both of them; therefore, the failed test case is assigned to the very high severity class (like for the test case TC9).

In an embodiment of the invention, the test report (240) is then changed by visually differentiating the failed test cases according to the corresponding classes. For example, if the display of text is black, it is possible to assign a red color (200) to the very high severity class (failed test cases TC4 and TC9), the orange color (210) to the high severity class (failed test case TC6), the yellow color (220) to the medium severity class (failed test case TC3), and the pale green color (230) to the low severity class (failed test case TC1 and TC7).

In this way, when the test report (240) is output (for example, by displaying it on the monitor of the analysis server) the different colors assigned to its failed test cases provide a very quick overview of the result of the test.

Moreover, it is possible to associate, with each failed test case, an indication of the corresponding exercised software components that have been changed since the previous execution of the failed test case when its suspicion attribute has the suspect value; it is also possible to associate, with each failed test case, an indication that it has been changed since the previous execution thereof when its change attribute has the changed value.

This directly drives the test analysts towards the specific portion of the software product and/or the specific test cases where the corresponding defects are likely to be present.

For example, simulations have confirmed that in this way it is possible to save up to 70-90% of the time that is generally spent for analyzing the test report (especially in tests with high instability due to environmental issues).

Figure 3:
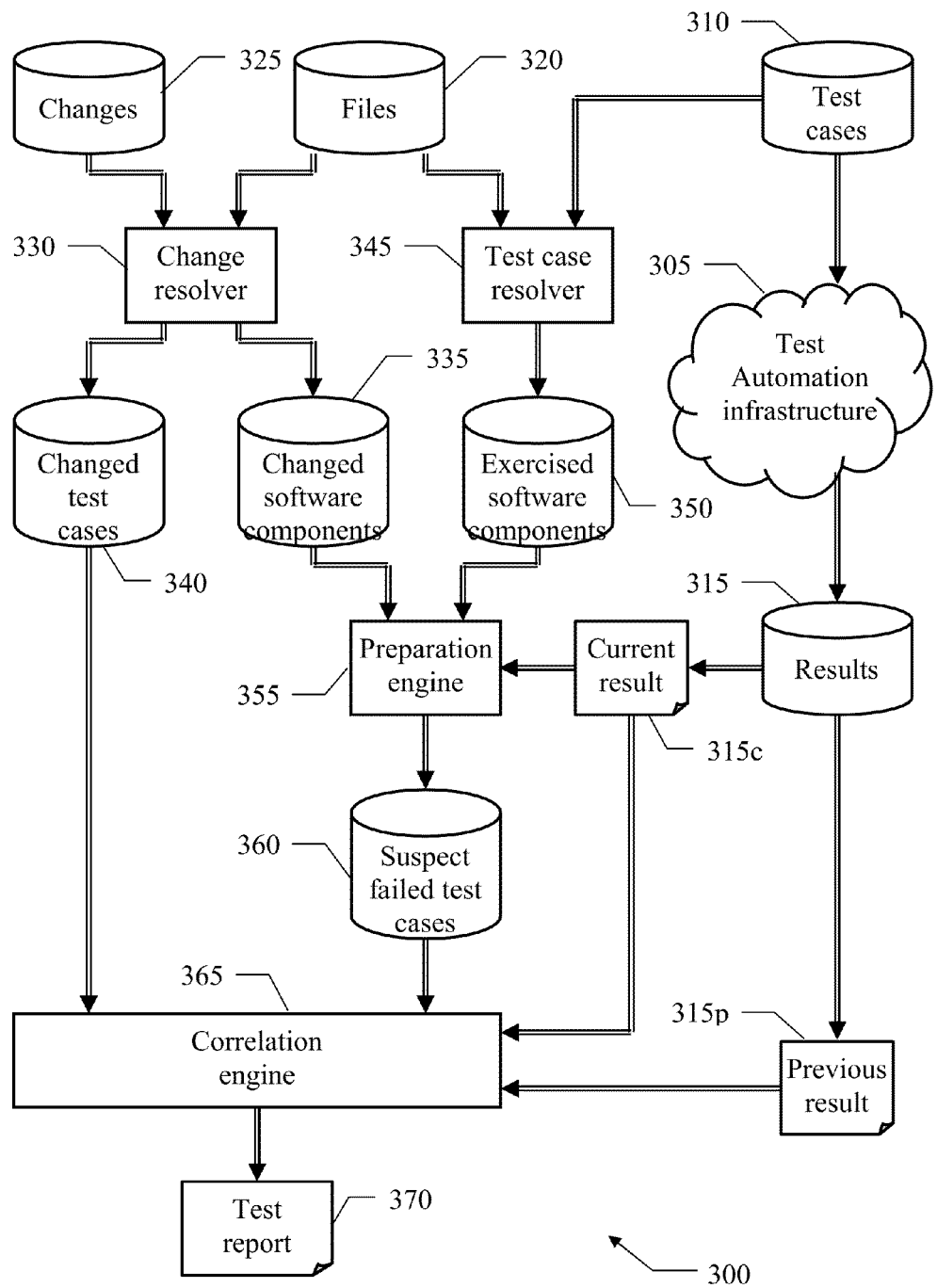
FIG. 3 shows a block diagram of the main software modules that may be used to implement the solution according to an embodiment of the invention.

With reference now to the FIG. 3, a block diagram is shown of the main software modules that may be used to implement the solution according to an embodiment of the invention (for example, within a test analysis tool 300). The information (programs and data) is typically stored in the hard-disk of the analysis server and loaded (at least partially) into its working memory when the programs are running. The programs are initially installed onto the hard-disk, for example, from DVDs.

Particularly, a test automation infrastructure 305 (possibly external to the test analysis server) controls the automatic execution of the test of the software product. For this purpose, the test automation infrastructure 305 accesses a repository 310 that stores a current version and any previous versions of all its test cases (i.e., their instructions and expected outcomes). The test automation infrastructure 305 saves the result of every execution of the test (i.e., its test report with the result of each test case) into a repository 315.

A repository 320 stores a specification of the software components that form the software product; the software components are defined with a relatively low granularity (for example, at the level of sub-components of each actual software unit of the software product, such as a communication layer, a policy engine and a message processor of an agent thereof). A repository 320 stores an indication of the files that implement each software component and test case. Another repository 325 stores a specification of the changes that have been applied to the software product and to the test cases before each execution of the test, but after its previous execution; for each execution of the test, the repository 325 comprises an indication of the files of the software product and its test cases that have been changed (comprising their creation). A change resolver 330 accesses the repository 320 and the repository 325. Whenever any current execution of the test is to be analyzed, the change resolver 330 determines the software components and the test cases that have been changed by comparing the files of the repositories 325 and 320; the change resolver 330 saves an indication of these changed software components into a repository 335 and an indication of these changed test cases into a repository 340.

A test case resolver 345 accesses the repository 310 and the repository 320. The test case resolver 345 at first determines the files that have been involved by the current execution of each test case by introspecting its instructions in the corresponding version of the test case (from the repository 310); the test case resolver 345 then determines the software components that have been exercised by each test case at its current execution by comparing the files so determined with the files of the software components (from the repository 320); the test case resolver 345 saves an indication of these exercised software components of each test case into a repository 350.

A preparation engine 355 accesses the repository 335 and the repository 350; moreover, it extracts the result of the current execution of the test (denoted as current result 315c) from the repository 315. For each failed test case (as indicated in the current result 315c), the preparation engine 355 determines whether it is suspect (i.e., the corresponding suspicion attribute has the suspect value) by comparing its exercised software components (from the repository 350) with the changed software components (from the repository 335); the preparation engine 355 saves an indication of the suspect failed test cases into a repository 360.

A correlation engine 365 accesses the repository 340 and the repository 360; moreover, it receives the current result 315c and extracts the result of the previous execution of the test (denoted as previous result 315p) from the repository 315. The correlation engine 365 classifies the failed test cases (from the current result 315c) according to their suspicion attributes (determined from the repository 360), change attributes (determined from the repository 340) and regression attributes (determined from the previous result 315p). The correlation engine 365 then generates a test report 370 by updating the current result 315c accordingly (for example, by assigning the color of the corresponding class to each failed test case).

Figure 4:
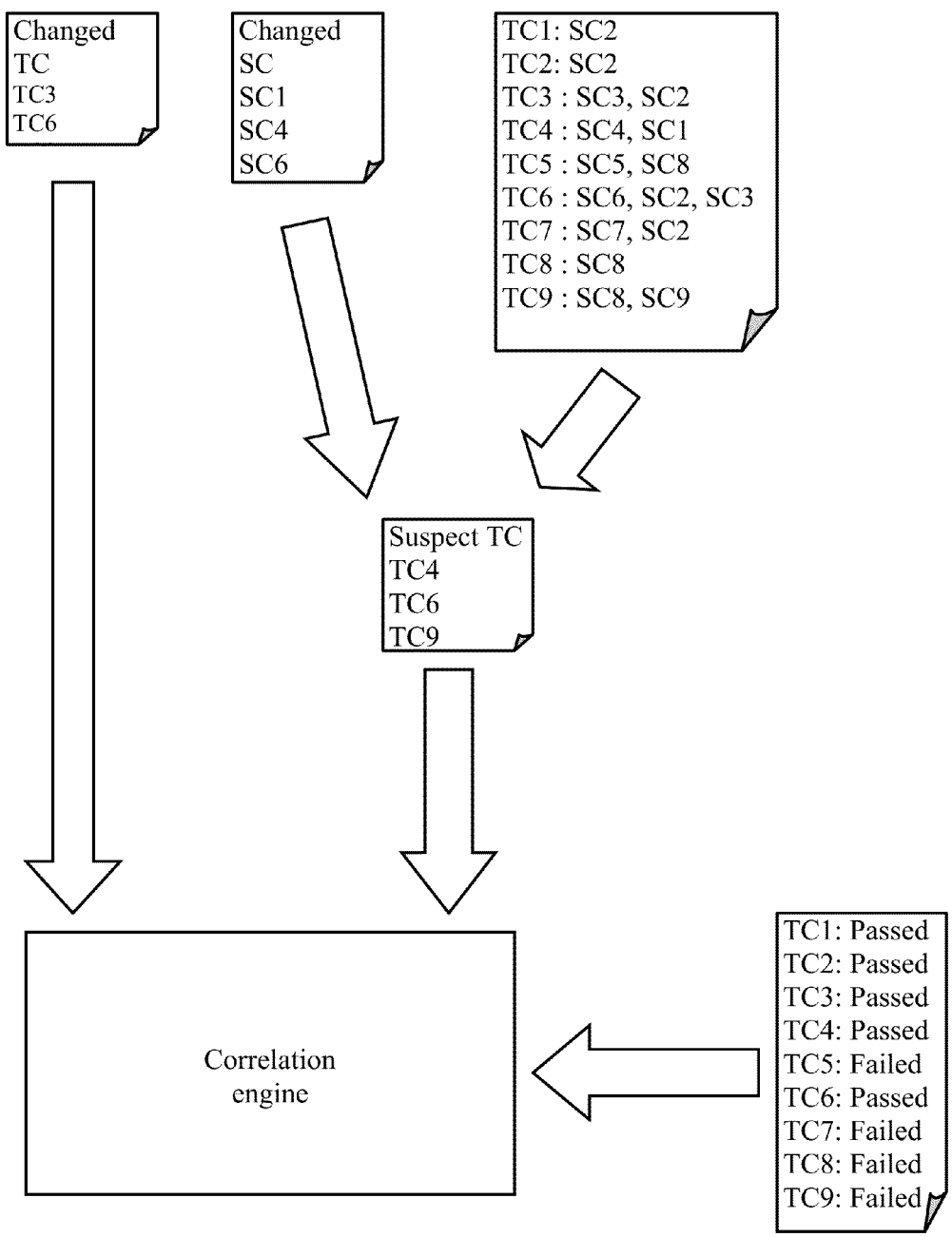
FIG. 4 shows an exemplary application of the solution according to an embodiment of the invention.

Particularly, an exemplary application of the solution according to an embodiment of the invention is shown in the FIG. 4.

In the specific scenario at issue, the changed software components are:
SC1, SC4, SC6, SC9,
and the changed test cases are:
TC3, TC6, TC9.
The exercised software components of the test cases TC1-TC9 are:
TC1: SC2
TC2: SC2
TC3: SC3, SC2
TC4: SC4, SC1
TC5: SC5, SC8
TC6: SC6, SC2, SC3
TC7: SC7, SC2
TC8: SC8
TC9: SC8, SC9
Therefore, the suspect failed test cases (having at least one exercised software component that is comprised in the changed software components) are TC4, TC6, TC9.
Moreover, the previous result of the test is:
TC1: Passed
TC2: Passed
TC3: Passed
TC4: Passed
TC5: Failed
TC6: Passed
TC7: Failed
TC8: Failed
TC9: Failed.
This information provides the above-described values of the suspicion, change and regression attributes of the failed test cases analyzed in the FIG. 2.

Figure 5A:
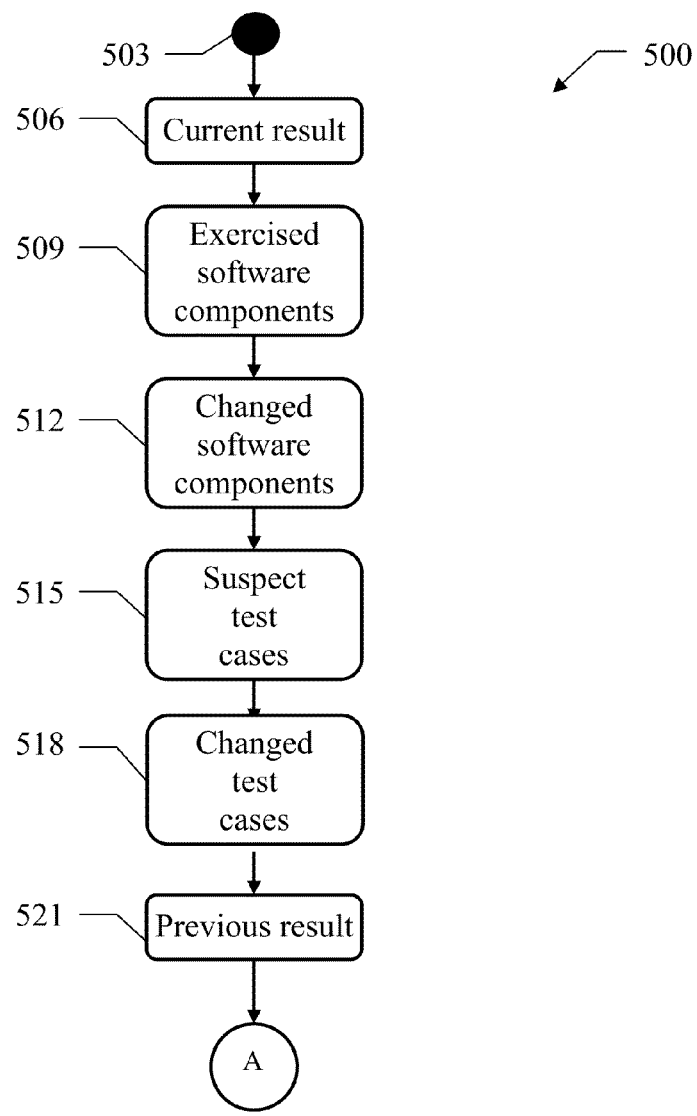
FIG. 5A-FIG. 5B show an activity diagram describing the flow of activities relating to an implementation of the solution according to an embodiment of the invention.
Figure 5B:
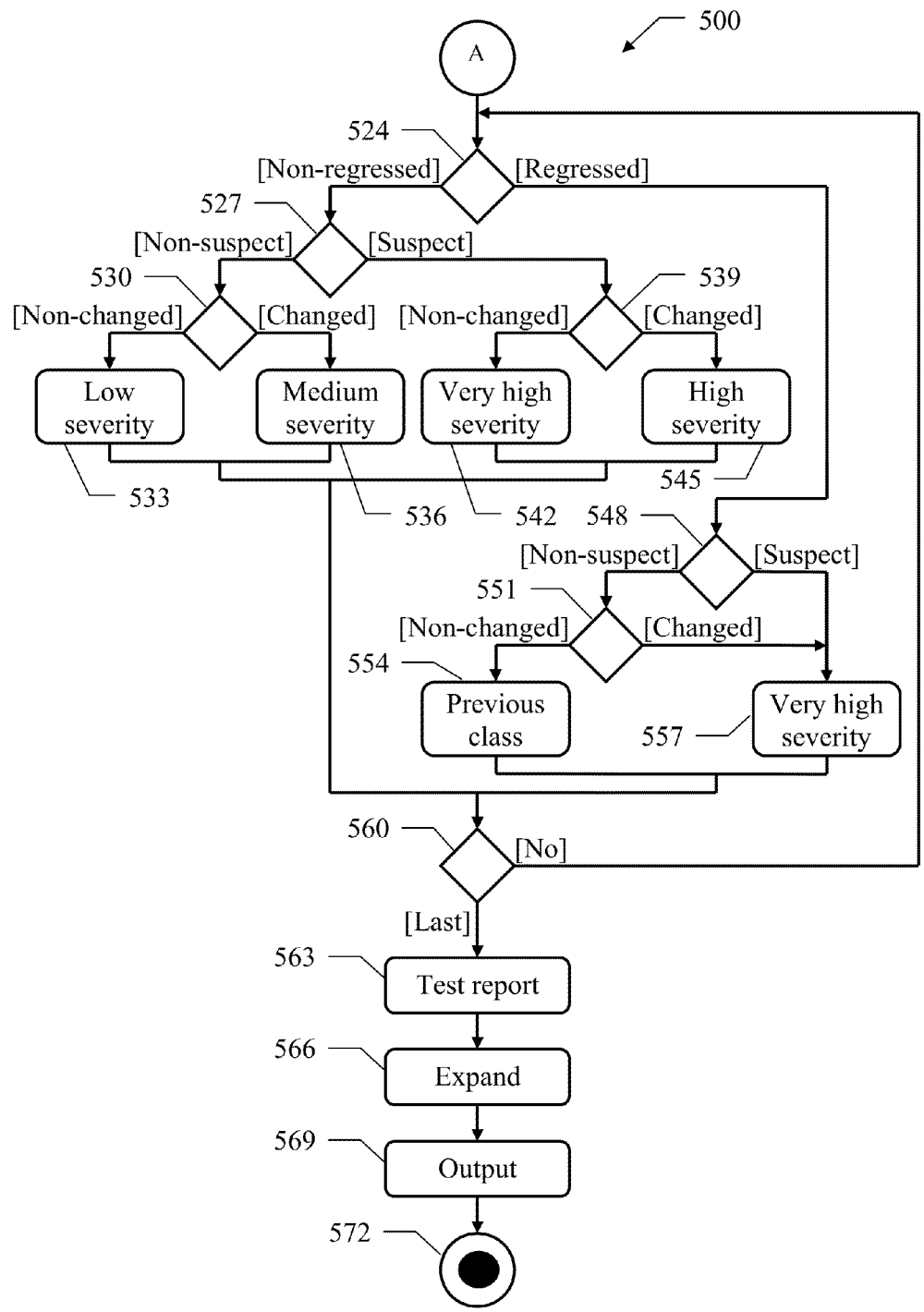

An activity diagram describing the flow of activities relating to an implementation of the solution according to an embodiment of the invention is shown in the FIG. 5A-FIG. 5B. Particularly, the activity diagram represents an exemplary process that may be implemented to analyze the current execution of the test with a method 500.

The method 500 begins at the black start circle 503 and then passes to block 506 wherein the current result of the test is imported into the test analysis tool from the test automation environment (if it is necessary).

Continuing to block 509, the exercised software components of each test case are retrieved. Moreover, the changed software components (since the previous execution of the test) are retrieved at block 512. The suspect failed test cases (defining the suspicion attributes of all the failed test cases) are now determined at block 515. Passing to block 518, the changed test cases (defining the change attributes of all the failed test cases) are retrieved. Moreover, the previous result of the test (defining the regression attributes of all the failed test cases) is retrieved at block 521.

A loop is then performed for classifying each failed test case (starting from the first one) by applying the above-described classification rules. These classification rules may be represented with a decision tree, comprising a node for each attribute of the failed test case with two branches descending from the node for its possible values, down to a plurality of leaf nodes each one representing a different class.

More specifically, a test is made on the regression attribute at block 524. If the regression attribute has the non-regressed value, another test is made on the suspicion attribute at block 527. If the suspicion attribute has the non-suspect value, another test is made on the change attribute at block 530. If the change attribute has the non-changed value, the failed test case is assigned to the low severity class at block 533; conversely, if the change attribute has the changed value, the failed test case is assigned to the medium severity class at block 536. Returning to the block 527, if the suspicion attribute instead has the suspect value, a test is made again on the change attribute at block 539. If the change attribute has the non-changed value, the failed test case is assigned to the very high severity class at block 542; conversely, if the change attribute has the changed value, the failed test case is assigned to the high severity class at block 445. Returning to the block 424, if the regression attribute instead has the regressed value, a test is made again on the suspicion attribute at block 448. If the suspicion attribute has the non-suspect value, a test is made again on the change attribute at block 551. If the change attribute has the non-changed value, the failed test case is assigned to the same class of its previous execution at block 554. Conversely, if the change attribute has the changed value, the failed test case is assigned to the very high severity class at block 557; the same block is also reached from the block 548 if the suspicion attribute has the suspect value.

In any case, the flow of activity descends into block 560 (from the block 533, the block 536, the block 542, the block 545, the block 554 or the block 557). A test is now made to determine whether a last failed test case has been classified. If not, the method 500 returns to the block 524 to repeat the same operations for a next failed test case. Conversely (once all the failed test cases have been classified), this loop is exited, descending into block 563. The test report is then generated from the result of the current execution of the test by assigning the color of the corresponding class to each failed test case. Proceeding to block 566, the test report is expanded by inserting a link from each failed test case to the definition of each one of its exercised software components that has been changed since the previous execution of the failed test case, when its suspicion attribute has the suspect value; moreover, the test report is expanded by inserting a link from each failed test case to its definition when its change attribute has the changed value. The (changed) test report so obtained is output at block 569. The method 500 then ends at the concentric white/black stop circles 572.

Naturally, in order to satisfy local and specific requirements, a person skilled in the art may apply to the solution described above many logical and/or physical modifications and alterations. More specifically, although this solution has been described with a certain degree of particularity with reference to one or more embodiments thereof, it should be understood that various omissions, substitutions and changes in the form and details as well as other embodiments are possible. Particularly, different embodiments of the invention may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the disclosed solution may be incorporated in any other embodiment as a matter of general design choice. In any case, ordinal or other qualifiers are merely used as labels to distinguish elements with the same name but do not by themselves connote any priority, precedence or order. Moreover, the terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variable involved), and the term a/an should be intended as one or more items (unless expressly indicated otherwise).

For example, an embodiment of the invention provides a method for analyzing a test of a software program; the test may be of any type (for example, a functional test, a validation test or a quality test) and it may be executed in any way (even manually); moreover, the software program may be of any type (for example, a tool, a web service, an operating system, and the like). The software product comprises a plurality of software components (of any type—for example, functions, classes, methods, procedures). The test comprises a plurality of test cases (in any number), each one for exercising a set of (one or more) corresponding exercised software components (determined in any way—for example, by setting them manually when the test case is created or changed). The method comprises the following steps. An indication of each failed test case whose current execution has failed is received (in any way—for example, from a failure log that only lists the failed test cases). A suspicion attribute of each failed test case is retrieved (in any way, see below); the suspicion attribute is indicative of a change to the corresponding exercised software components since a previous execution of the failed test case (of any type, see below). A change attribute of each failed test case is retrieved (in any way—for example, by setting it manually when the test cases are changed); the change attribute is indicative of a change to the failed test case since the previous execution thereof (of any type, see below). A regression attribute of each failed test case is retrieved (in any way—for example, from the results of multiple previous executions of the failed test case); the regression attribute is indicative of a regression of the failed test case since the previous execution thereof (of any type, see below). Each failed test case is classified into a plurality of disjoint classes (of any number and type, see below) according to the corresponding suspicion attribute, change attribute and regression attribute (in any way, see below).

However, the same solution may be implemented with an equivalent method (by using similar steps with the same functions of more steps or portions thereof, removing some steps being non-essential, or adding further optional steps); moreover, the steps may be performed in a different order, concurrently or in an interleaved way (at least in part).

In an embodiment of the invention, the step of retrieving a suspicion attribute of each failed test case comprises the following operations. An indication is retrieved of the exercised software components of each failed test case. An indication is retrieved of a set of changed software components of the software product that have been changed since the previous execution of the failed test cases. The suspicion attribute of each failed test case is determined according to a comparison between the corresponding exercised software components and the changed software components.

However, the exercised software components may be determined in any way (for example, by setting them manually when the test cases are created); moreover, the changed software components may be determined in any way (for example, by setting them manually when they are changed). In any case, the suspicion attribute may be determined in a different way (for example, by setting it directly in all the involved test cases when any software component is changed).

In an embodiment of the invention, the step of retrieving a suspicion attribute of each failed test case comprises setting the suspicion attribute of the failed test case to a suspected value when at least one of the corresponding exercised software components has been changed since the previous execution of the failed test case or to a non-suspected value otherwise. The step of retrieving a change attribute of each failed test case comprises setting the change attribute of the failed test case to a changed value when the failed test case has been changed since the previous execution of the failed test case or to a non-changed value otherwise. The step of retrieving a regression attribute of each failed test case comprises setting the regression attribute of the failed test case to a regressed value when the previous execution of the failed test case has failed or to a non-regressed value otherwise.

However, these attributes may be set to different values (even not of the Boolean type) and in a different way (for example, according to a measure of the changes to the exercised software components for the suspicion attribute, to a measure of the changes to the failed test case for the change attribute, or according to a measure of the difference between the results of the failed test case for the regression attribute, or by discarding the new exercised software components and the new test cases).

In an embodiment of the invention, the step of classifying each failed test case comprises assigning the failed test case to a very high severity class when the corresponding regression attribute has the non-regressed value, the corresponding suspicion attribute has the suspect value, and the corresponding change attribute has the non-changed value.

In an embodiment of the invention, the step of classifying each failed test case comprises assigning the failed test case to a high severity class, indicative of a severity lower than a severity of the very high severity class, when the corresponding regression attribute has the non-regressed value, the corresponding suspicion attribute has the suspect value, and the corresponding change attribute has the changed value.

In an embodiment of the invention, the step of classifying each failed test case comprises assigning the failed test case to a medium severity class, indicative of a severity lower than a severity of the high severity class, when the corresponding regression attribute has the non-regressed value, the corresponding suspicion attribute has the non-suspect value, and the corresponding change attribute has the changed value.

In an embodiment of the invention, the step of classifying each failed test case comprises assigning the failed test case to a low severity class, indicative of a severity lower than a severity of the medium severity class, when the corresponding regression attribute has the non-regressed value, the corresponding suspicion attribute has the non-suspect value, and the corresponding change attribute has the non-changed value.

In an embodiment of the invention, the step of classifying each failed test case comprises assigning the failed test case to the very high severity class when the corresponding regression attribute has the regressed value, and the corresponding suspicion attribute has the suspect value or the corresponding change attribute has the changed value.

In an embodiment of the invention, the step of classifying each failed test case comprises assigning the failed test case to the class being assigned to the failed test case at the previous execution of the failed test case when the corresponding regression attribute has the non-regressed value, the corresponding suspicion attribute has the non-suspect value, and the corresponding change attribute has the non-changed value.

However, the above described classification rules are merely illustrative and in no way limitative. For example, nothing prevents defining any other number of classes (down to only two); moreover, the failed test cases may be assigned to the classes in any other way (for example, by weighting their attributes). In any case, the classification of the failed test cases may be implemented in any way (for example, by means of a neural network).

In an embodiment of the invention, a test report is output; the test report comprises at least an indication of the failed test cases that are visually differentiated according to the corresponding classes.

However, the test report may be output in any other way (for example, on a printer), and the classes may be differentiated with any other visual clue (for example, different flags). In any case, the classification of the failed test cases may be used in any other way (for example, to populate a database).

In an embodiment of the invention, the step of outputting a test report comprises outputting, in association with each failed test case, an indication of said at least one corresponding exercised software component that has been changed since the previous execution of the failed test case when the corresponding suspicion attribute has the suspect value; in addition or in alternative, this comprises outputting an indication that the failed test case has been changed since the previous execution of the failed test case when the corresponding change attribute has the changed value.

However, these exercised software components and failed test cases may be indicated in any way (for example, by simply listing their names or with the addition of a flag, respectively); in any case, nothing prevents providing this information only on request.

An embodiment of the invention provides a computer program, which comprises code means for causing a data-processing system (for example, the above-described analysis server) to perform the steps of the proposed method when the computer program is executed on the system.

However, the program may be implemented as a stand-alone module, as a plug-in for the test analysis tool, or even directly in the test analysis tool itself. It would be readily apparent that it is also possible to deploy the same solution as a service that is accessed through a network (such as in the Internet). In any case, similar considerations apply if the program is structured in a different way, or if additional modules or functions are provided; likewise, the memory structures may be of other types, or may be replaced with equivalent entities (not necessarily consisting of physical storage media). The program may take any form suitable to be used by any data-processing system or in connection therewith (for example, within a virtual machine), thereby configuring the data-processing system to perform the desired operations; particularly, the program may be in the form of external or resident software, firmware, or micro-code (either in object code or in source code—for example, to be compiled or interpreted). Moreover, it is possible to provide the program on any computer-usable medium (and particularly as an article of manufacture on a non-transitory medium); the medium may be any element suitable to contain, store, communicate, propagate, or transfer the program. For example, the medium may be of the electronic, magnetic, optical, electromagnetic, infrared, or semiconductor type; examples of such medium are hard-disks (where the program may be pre-loaded), removable disks, tapes, cards, wires, fibers, wireless connections, networks, broadcast waves, and the like. In any case, the solution according to an embodiment of the present invention lends itself to be implemented even with a hardware structure (for example, integrated in a chip of semiconductor material), or with a combination of software and hardware suitably programmed or otherwise configured.

An embodiment of the invention provides a data-processing system, which comprises means for performing the steps of the same method (for example, the above-described analysis server).

However, similar considerations apply if the data-processing system has a different structure or comprises equivalent components, or it has other operative characteristics. In any case, every component thereof may be separated into more elements, or two or more components may be combined together into a single element; moreover, each component may be replicated to support the execution of the corresponding operations in parallel. It is also pointed out that (unless specified otherwise) any interaction between different components generally does not need to be continuous, and it may be either direct or indirect through one or more intermediaries. More specifically, the same method may also be carried out on a data-processing system based on a different architecture (for example, a local, wide area, global, cellular or satellite network), and exploiting any type of (wired and/or wireless) connections. In any case, the data-processing system may have another structure or may comprise similar elements (such as cache memories temporarily storing the programs or parts thereof); moreover, it is possible to replace the analysis server with any code execution entity, either based on a physical machine or a virtual machine (such as a PDA, a mobile phone, and the like), or with a combination of multiple entities (such as a multi-tier architecture, a grid computing infrastructure, and the like).

The invention claimed is:

1. A method for analyzing a test of a software program comprising a plurality of software components, the test comprising a plurality of test cases each one for exercising a set of corresponding exercised software components, wherein the method comprises the steps of:
   receiving an indication of each failed test case of the plurality of test cases whose current execution has failed; and
   classifying all failed test cases comprising the each failed test case into a plurality of disjoint classes according to a corresponding suspicion attribute, change attribute and regression attribute, wherein the suspicion attribute of the given failed test case of the all failed test cases is indicative of a change to a corresponding exercised software component since a previous execution of the given failed test case, the change attribute of the given failed test case is indicative of a change to the given failed test case since the previous execution of the given failed test case, and the regression attribute of the given failed test case is indicative of a regression of the given failed test case since the previous execution of the given failed test case.

2. The method according to claim 1, further comprising:
   retrieving an indication of the corresponding exercised software components of the given failed test case;
   retrieving an indication of a set of changed software components of a software product being changed since the previous execution of the given failed test case; and
   determining the suspicion attribute of the given failed test case according to a comparison between the corresponding exercised software components and the changed software components.

3. The method according to claim 1, further comprising
   setting the suspicion attribute of the given failed test case to a suspect value when at least one of the corresponding exercised software components has been changed since the previous execution of the given failed test case or to a non-suspect value otherwise;
   setting the change attribute of the given failed test case to a changed value when the given failed test case has been changed since the previous execution of the given failed test case or to a non-changed value otherwise; and
   setting the regression attribute of the given failed test case to a regressed value when the previous execution of the given failed test case has failed or to a non-regressed value otherwise.

4. The method according to claim 3, wherein the step of classifying each failed test case comprises:
   assigning the given failed test case to a very high severity class when the corresponding regression attribute has the non-regressed value, the corresponding suspicion attribute has the suspect value, and the corresponding change attribute has the non-changed value.

5. The method according to claim 4, wherein the step of classifying each failed test case comprises:
   assigning the given failed test case to a high severity class, indicative of a severity lower than a severity of the very high severity class, when the corresponding regression attribute has the non-regressed value, the corresponding suspicion attribute has the suspect value, and the corresponding change attribute has the changed value.

6. The method according to claim 5, wherein the step of classifying each failed test case comprises:
   assigning the given failed test case to a medium severity class, indicative of a severity lower than a severity of the high severity class, when the corresponding regression attribute has the non-regressed value, the corresponding suspicion attribute has the non-suspect value, and the corresponding change attribute has the changed value.

7. The method according to claim 6, wherein the step of classifying each failed test case comprises:
   assigning the given failed test case to a low severity class, indicative of a severity lower than a severity of the medium severity class, when the corresponding regression attribute has the non-regressed value, the corresponding suspicion attribute has the non-suspect value, and the corresponding change attribute has the non-changed value.

8. The method according to 4, wherein the step of classifying each failed test case comprises:
   assigning the given failed test case to the very high severity class when the corresponding regression attribute has the regressed value, and the corresponding suspicion attribute has the suspect value or the corresponding change attribute has the changed value.

9. The method according to claim 3, wherein the step of classifying each failed test case comprises:
   assigning the given failed test case to the class being assigned to the given failed test case at the previous execution of the given failed test case when the corresponding regression attribute has the non-regressed value, the corresponding suspicion attribute has the non-suspect value, and the corresponding change attribute has the non-changed value.

10. The method according to claim 1, further comprising the step of:
    outputting a test report comprising an indication of the all failed test cases being visually differentiated according to the corresponding classes.

11. The method according to claim 3, further comprising:
outputting, in association with each of the given failed test case of the all failed test cases, a test report comprising an indication of said at least one corresponding exercised software component being changed since the previous execution of the given failed test case when the corresponding suspicion attribute has the suspect value and/or an indication that the given failed test case has been changed since the previous execution of the given failed test case when the corresponding change attribute has the changed value.

12. A computer program stored on a non-transitory computer-usable medium and comprising code means for causing a data-processing system to perform the steps of the method according to claim 1 when the computer program is executed on the data-processing system.

\* \* \* \* \*